P. F. Crouch,
Shears:
No. 54,508.   Patented May 8, 1866.

Witnesses:
Chas. A. Smith
Geo. D. Walker

Inventor:
P. F. Crouch

UNITED STATES PATENT OFFICE.

P. F. CROUCH, OF NEW YORK, N. Y.

IMPROVEMENT IN SHEARS.

Specification forming part of Letters Patent No. 54,508, dated May 8, 1866.

*To all whom it may concern:*

Be it known that I, P. FREDERICK CROUCH, of the city and State of New York, have invented and made a certain new and useful Improvement in Shears; and I do hereby declare the following to be a full, clear, and exact description of the said invention, reference being had to the annexed drawings, making part of this specification, wherein—

Figure 1:
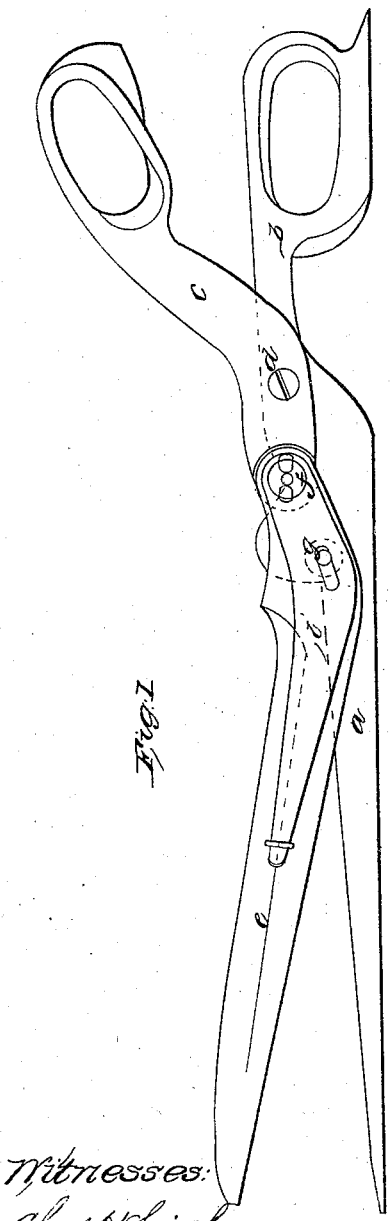
Figure 2:
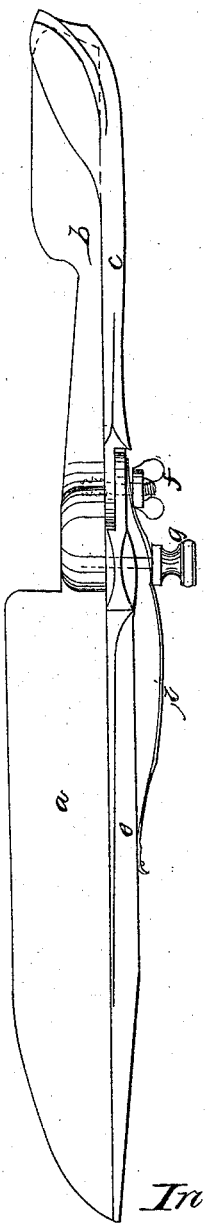

Figure 1 is a side elevation of said shear, and Fig. 2 is a plan of the same.

Similar marks of reference denote the same parts.

Shears have heretofore been made for cutting cloth and other substances by hand in which the lower blade has been fitted to rest upon the table, while the upper blade and handle move upon two centers and swing up and down in cutting without disturbing said lower blade, the object in view being to allow the layers of cloth or other material being cut to remain stationary or nearly so, and not be raised as much as with the ordinary shears.

The nature of my said invention consists in arranging the upper shear-blade and handle in such a manner that an endwise motion is given to the said blade in order that it may act with a drawing cut and more easily separate the material being cut. This is more especially operative toward the end of the cut when the leverage of the handle upon the blade is less. Thereby the power required is not as great, in consequence of the drawing action of the said blade in cutting.

In the drawings, *a* is the lower or bed shear, made sufficiently thin to pass easily under the cloth or other material to be cut. *b* is the handle of this shear *a*. *c* is the upper or moving handle on the fulcrum *d*, and *e* is the upper blade, united to the handle *c* by the screw or rivet *f*, and *g* is the fulcrum-screw for the blade *e*.

The blade *e* is slotted for the reception of the fulcrum screw or pin *g*, and it will now be evident that as the joint at *f* describes an arc of circle the blade as it is opened or closed is moved endwise on its slotted fulcrum *g*, and hence acts with a drawing cut, and that endwise action is the greatest when the blade *e* is almost closed to the blade *a;* hence great facility is afforded for cutting, because but little more power has to be exerted at the termination of each cut than at the beginning.

The relative locations of the fulcra *d* and *g* and joint *f* might be varied from that shown, so as to make the drawing action of the upper shear operative to a greater extent at the beginning of each cut, if desired.

I make use of a spring, *i*, attached at one end by the joint-screw *f*, and pressed to the blade *e* by its fulcrum-screw *g*, so that the said blade *e* is kept up to the blade *a* with the necessary force, and the spring being slotted at the fulcrum *g* allows of the spring moving with the blade.

What I claim, and desire to secure by Letters Patent, is—

1. The blade *e*, with a slot or mortise for the fulcrum *g*, in combination with the handle *c*, shear *a*, and handle *b*, as set forth, whereby the blade *e* receives an endwise motion to act with a drawing cut, as specified.

2. The broad thin blade *a*, blade *e*, and spring *i*, in combination with the handles *b* and *c*, joint *f*, and slotted fulcrum *g*, for the purposes and as set forth.

In witness whereof I have hereunto set my signature this 25th day of October, A. D. 1865.

P. F. CROUCH.

Witnesses:
LEMUEL W. SERRELL,
GEO. D. WALKER.